United States Patent
Kwag

[19]

[11] Patent Number: 6,149,093
[45] Date of Patent: Nov. 21, 2000

[54] TENSION REDUCER OF A RETRACTOR FOR AN AUTOMOBILE SAFETY SEAT BELT

[75] Inventor: Tae-Bong Kwag, Wonjoo-shi, Rep. of Korea

[73] Assignee: Sungwoo Corporation, Seoul, Rep. of Korea

[21] Appl. No.: 09/198,487

[22] Filed: Nov. 24, 1998

[30] Foreign Application Priority Data

Apr. 30, 1998 [KR] Rep. of Korea ...................... 98-15679

[51] Int. Cl.$^7$ ................................................. B60R 22/44
[52] U.S. Cl. .......................................................... 242/372
[58] Field of Search ........................... 242/372; 280/806, 280/807; 297/475–478

[56] References Cited

U.S. PATENT DOCUMENTS

| | | | |
|---|---|---|---|
| 4,993,657 | 2/1991 | Brown | 242/372 |
| 5,080,298 | 1/1992 | Sasaki et al. | 242/372 |
| 5,165,621 | 11/1992 | Mizuno et al. | 242/372 |
| 5,195,693 | 3/1993 | Sasaki et al. | 242/372 |
| 5,328,119 | 7/1994 | Sasaki | 242/372 |
| 5,478,024 | 12/1995 | Ray | 242/372 |
| 5,553,802 | 9/1996 | Park et al. | 242/372 |

*Primary Examiner*—John M. Jillions
*Attorney, Agent, or Firm*—Lowe Hauptman Gopstein Gilman & Berner

[57] ABSTRACT

A tension reducer for relieving the drawing force of a retractor for an automobile safety seat belt comprises a clutch apparatus cooperated with a retractor for inducing the smooth operation of a webbing upon the pulling out and retracting of a web, the clutch apparatus including first and second coil springs mounted therein which have different elastic force assisting in the webbing to be changed directly into a rotation force thereof, thereby reducing the friction and noise of the coil springs and removing the eccentric rotation thereof.

8 Claims, 6 Drawing Sheets

TENSION REDUCER OF A RETRACTOR FOR AN AUTOMOBILE SAFETY SEAT BELT

BACKGROUND OF THE INVENTION

The present invention relates to a retractor for an automobile safety seat belt, and more particularly, to a tension reducer including a clutch apparatus mounted on one side of a retractor to relieve a webbing belt (called "webbing" below) of tension.

PRIOR ART

A conventional seat belt can cause a user discomfort due to belt pressure against a user's breast. To reduce the uncomfortable feeling of the webbing, there are various types of well-known tension reducers. A typical tension reducer is disclosed in U.S. Pat. No. 5,328,119, which is designed to stop the rotation of a winding shaft facing one side of the surface of a webbing plate so that the winding of the webbing is interrupted, while enabling reverse rotation of the winding shaft so that webbing is drawn out, thereby relieving webbing pressure.

Referring to FIG. 1, the tension reducer 10 comprises a plate 12 attached to the frame of a webbing retractor (not shown). An adaptor 16 includes an axle portion 17 which is inserted into a hole 14 formed in the plate 12. A holder 32 includes axle portions 33 and 36 projecting from the center portion of both side surfaces thereof and a ratchet portion 34 is formed around its outer circumference. A first coil spring 20, including one outer end 20A hooked on a notch 18 of the adaptor 16 and the other inner end 20B hung on an inner notch 35 of the holder 32, provides the winding force to a winding shaft of the retractor. A second coil spring 40 includes one outer inner end 40A engaged with a notch 38 of the holder 32 and the other outer end 40B attached to a cover 42. The second coil spring 40 has a stronger elastic force than the first coil spring 20. The adaptor 16, the first and second coil springs 20, 40 and the holder 32 are all connected in series along an axis CL.

Furthermore, the tension reducer 10 comprises a pawl lever 50 and a solenoid 56 to control the rotation of the holder 32, selectively. The pawl lever 50 includes a hook 52 which is rotated by a plunger 58 of the solenoid 56 to engage the ratchet 34 of the holder 32. A return spring 54 provides a returning force with the pawl lever 50.

Therefore, before the webbing is placed across the user's chest it is wound on the retractor shaft. The first coil spring 20 is tightly wound, while the second coil spring 40 is released out to its maximum. If the passenger then pulls out the webbing from the retractor to place on the webbing across their chest, the solenoid 56 operates to extend the plunger 58 so that the pawl lever 50 is pivoted and the hook 52 engages with the ratchet 34. The webbing is then released out only by the first coil spring 20. In other words, the winding force of the first coil spring 20 is applied to the adaptor 16 to rotate the winding shaft. As the first coil spring 20 is loosened, the pulling out of the webbing releases the pressure on the passenger.

Since the tension reducer includes both side surfaces of the holder contacting the first weaker coil spring and the second stronger coil spring, respectively, the first weak coil spring makes contact with one surface of the adaptor and the second stronger coil spring makes contact with one surface of the cover. The tension reducer has the excellent features of no noise and friction, but when pulling out the webbing the first coil spring, the holder and the second coil spring cooperate with each other so that the first and second coil springs are both contacted with both side surfaces of the holder and the second coil spring which generate more friction and noise therebetween. During the winding of the webbing, the first coil spring causes friction against one side surface of the cover when the holder makes contact with the other surface of the holder, and the second coil spring frictionally makes contact with the other side surface of the holder. This means that the tension reducer fails to reduce the noise generated between the cooperating elements.

Furthermore, when the webbing retracts, the tension force of the second coil spring is transferred to the first coil spring, so that an unbalanced force occurs, which causes the adaptor and the holder to move in opposite directions, thereby resulting in an unstable operation. This is the reason that the first coil spring, the holder, the second coil spring and the cover are connected in series. The prior art to which the tension reducer belongs are disclosed in U.S. Pat. Nos. 4,993,567 and 5,080,298. But, these patents have disadvantages similar to those of the prior tension reducer.

In light of these points, if the contact of a holder, an adaptor and first and second coil springs with each other are minimized and the holder is rotated forward and reversed by the springs in order to be directly operated with a retractor shaft, it can resolve the noise problem and induce the stable operation of a system. Therefore, it is very desirable to design a clutch structure in which the first and second coil springs are mounted in the holder to change the tension force into a rotating one.

Therefore, an object of the invention is to provide a tension reducer including a clutch apparatus integrated with at least two coil springs, in which one spring is not subject to the influence of the tension force of the other coil spring.

Another object of the invention is to provide a tension reducer including a clutch apparatus in which a holder is provided with at least two coil springs to absorb their elastic force as well as to interrupt the force of a webbing upon the pulling out and retraction of the webbing, thereby removing friction generated between the holder and each of coil springs.

Another object of the invention is to provide tension coil springs including a clutch apparatus and a holder that comprises a stay shaft and a bush shaft to contain at least two coil springs therein, integrally, thereby preventing the friction of the coil springs against the holder and the eccentric rotation of the clutch apparatus.

Herein, it is known that the invention enables two coil springs to be integrally mounted in a holder in order to minimize the friction therebetween and reduce the noise generated at maximum, thereby simplifying its configuration and shortening the assembly time. The invention comprises a clutch apparatus wherein the holder, a stay shaft and a bush shaft are integrally coupled with one another between a base and a cover to interrupt the drawing force of a webbing, thereby minimizing the rotation friction of the holder induced against the coil springs.

SUMMARY OF THE INVENTION

Accordingly, the invention provides a tension reducer for reducing the drawing force of a retractor comprising a clutch means for enabling the elastic forces of first and second coil springs assisting in the webbing to be changed directly into a rotation force thereof when pulling out and retracting a webbing; a lever means for stopping the rotation of the clutch means when the webbing is not drawn out further; a cover for enabling the clutch means to be rotatably mounted therein and the lever means to be properly positioned therein with a base; and the base for enabling the clutch means and the lever means to be fixed therein with the cover.

BRIEF DESCRIPTION OF THE DRAWINGS

The invention now will be described in detail with reference to the accompanying drawings, in which.

DETAILED DESCRIPTION OF THE INVENTION

Figure 1:
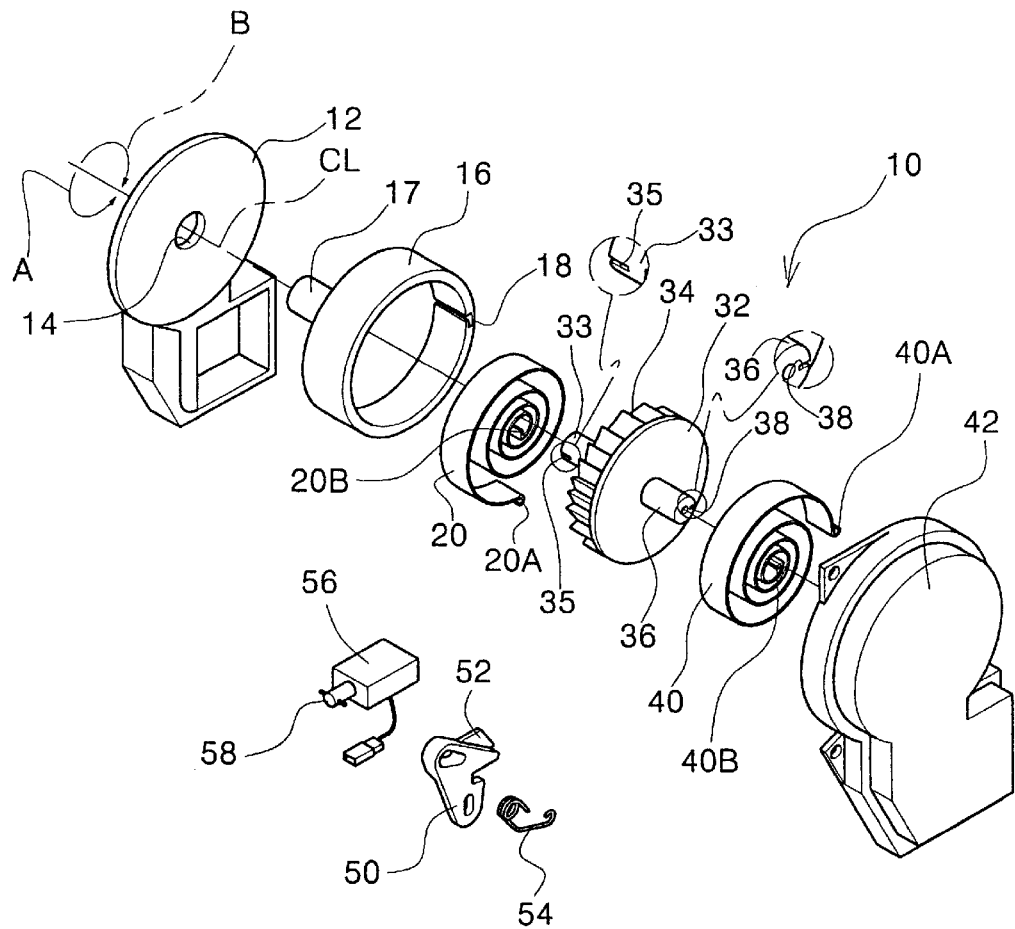
FIG. 1 is an exploded perspective view of a prior art tension reducer.
Figure 2:
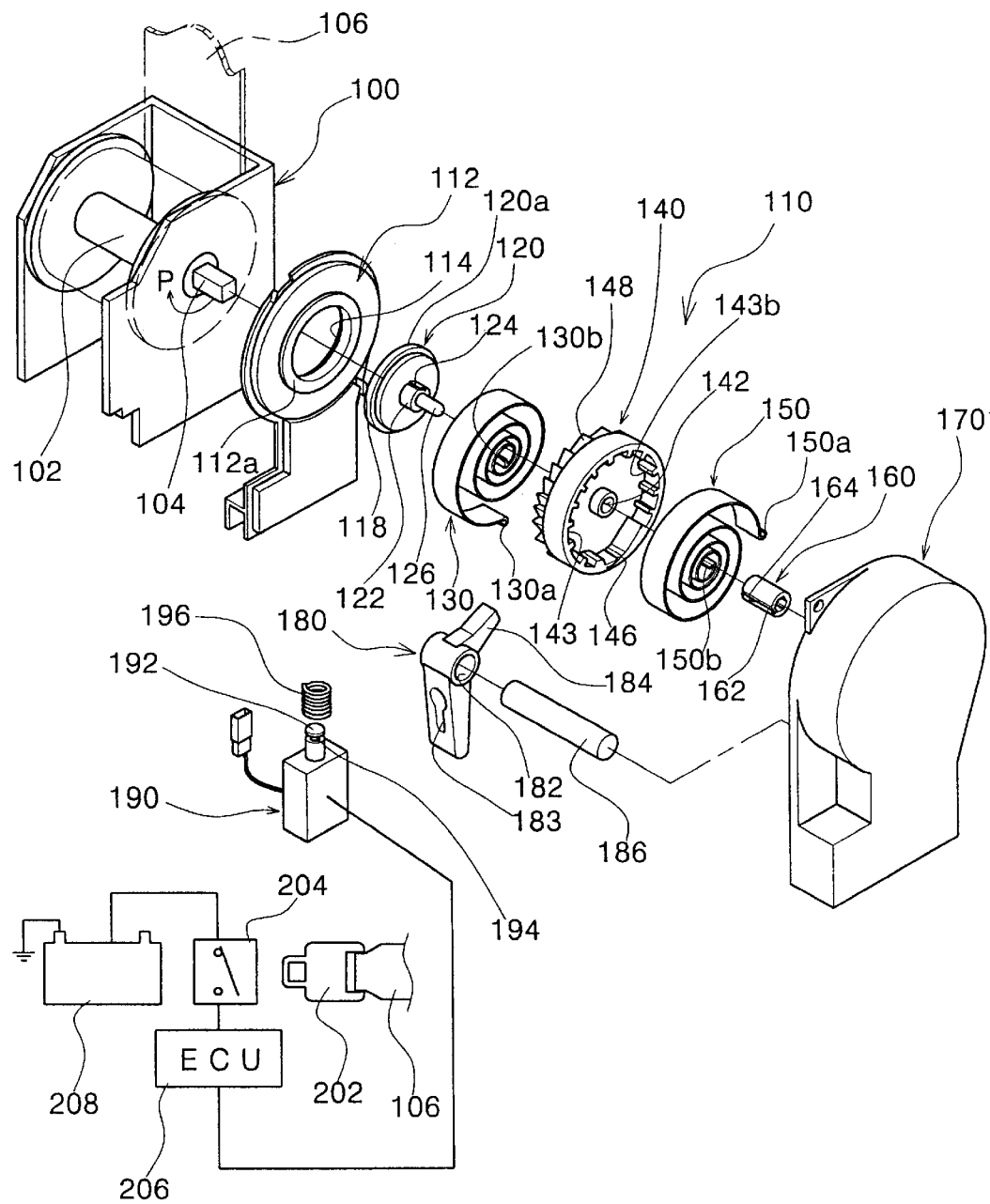
FIG. 2 is an exploded perspective view of the tension reducer according to the invention.
Figure 3:
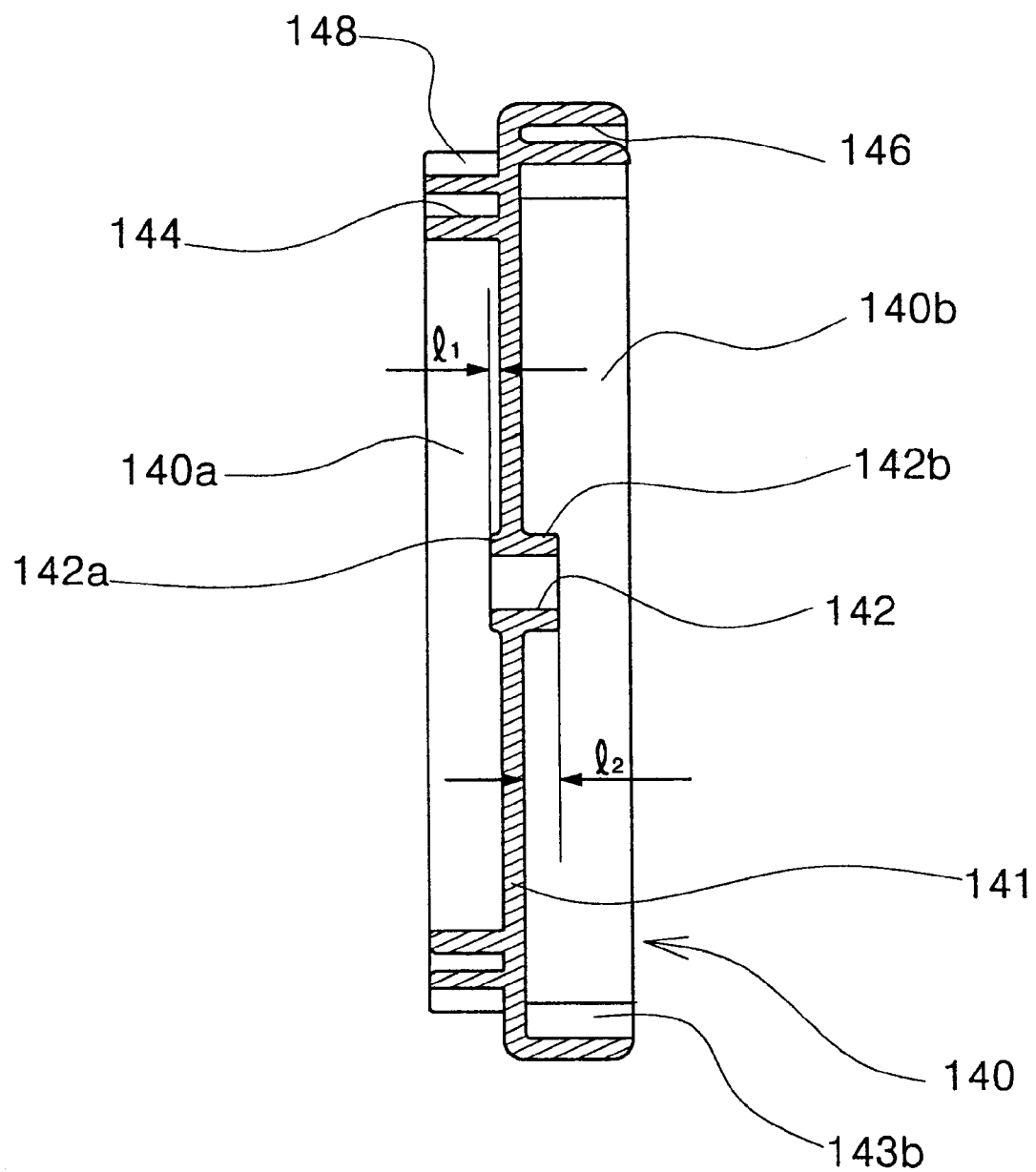
FIG. 3 is a cross sectional view of the configuration of the tension reducer according to the invention.

Referring to FIG. 2, a tension reducer comprises a clutch apparatus 110 provided with a holder 140. The holder 140 is a unit including two coil spring receptacles 140a and 140b (FIG. 3) formed on both sides of a middle wall 141 as shown in FIG. 3. The middle wall 141 has a center hole 142 from which first and second bosses 142a and 142b respectively project by axial distances 11 and 12. The distance 12 is longer than 11 in order to induce the rotation of the holder 140 as illustrated below. The first receptacle 140a is a cylinder having a smaller diameter around which double walls are wrapped, and the second receptacle 140b is also a cylinder formed around the outer circumstance to have the same diameter as that thereof. The first receptacle 140a includes a first hooking groove 144 formed to retain an outer end 130a of a coil spring 130 when the coil spring is mounted into the first receptacle 140a, and a ratchet portion 148 formed as a plurality of teeth on the outer circumferential surface of the cylinder. The second receptacle 140b includes a second hooking groove 146 formed to retain an outer end 150a of a coil spring 150 when the coil spring is mounted into the second receptacle 140b, and a plurality of projectors 143b formed on the inner circumferential surface of the cylinder to minimize the friction against the coil spring 150 being mounted therein.

The first coil spring 130 includes the outer end 130a retained in the outer hooking groove 144 and an inner end 130b inserted into a hooking groove 124 upon being mounted in the holder 140. The hooking groove 124 is formed on a center boss 122 of a bush shaft 120 as illustrated in detail below.

Figure 4:
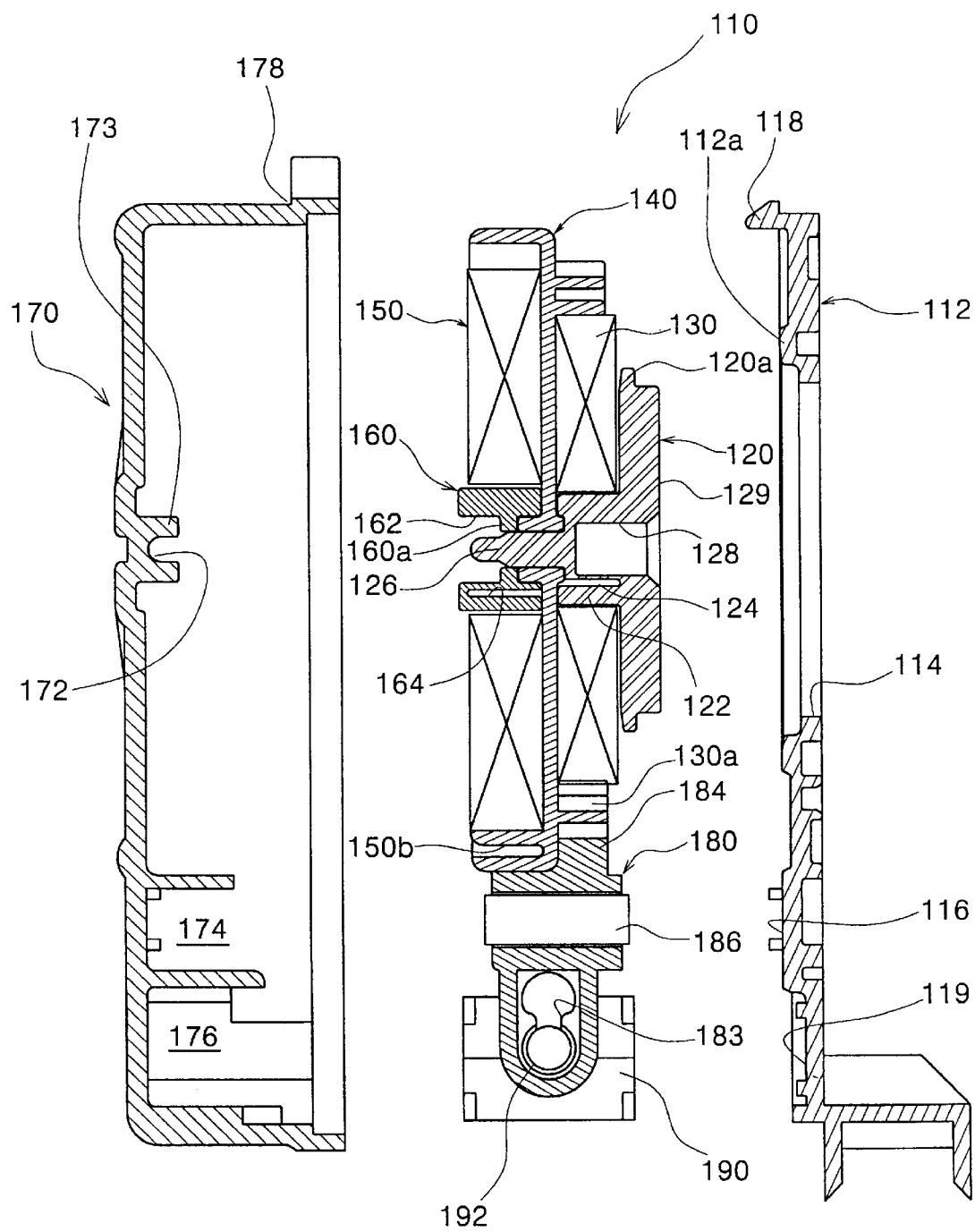
FIG. 4 is a cross sectional view of the separated assembling units of the tension reducer according to the invention.

The second coil spring 150 also includes the outer end 150a retained in the outer hooking groove 146 and an inner end 150b supported in a hooking groove 162 of a stay shaft 160 explained in detail below. The configuration can be clarified from the clutch apparatus 110 as shown in FIG. 4.

The clutch apparatus 110 further comprises the bush shaft 120 and the stay shaft 160 subject to enable the first and second coil springs 130 and 150 to be respectively mounted in the first and second receptacles 140a and 140b on the left and right sides of the holder 140.

The bush shaft 120 includes a circular disk 129 (FIG. 4), on one side surface of which a shoulder 120a is formed in a step form and on the other side surface of which a projector 126 and the circular boss 122 are integrated with each other to be inserted and project into/from the center hole 142 of the holder 140 in turn. The hooking groove 124 is formed on the circular boss 122 to permit the inner end 130b to be inserted thereinto. A bush groove 128 is formed at the center of the disk 129 to force one end 104 of a webbing retractor shaft 102 to be fitted thereinto by a predetermined depth of the boss 122 and cooperate with the retractor shaft upon webbing. The bush shaft 120 forces the first coil spring 130 to be wound on the circular boss 122 and then continues to rotate the holder 140, so that the second coil spring 150 is wound on a stay shaft 160 during the winding of the webbing, thereby having their elastic forces oppose each other. Upon completion of the winding of the webbing, the bush shaft 120 exerts the elastic force of the first coil spring 130 on the webbing to relieve the tension force of the webbing wound on the retractor shaft 102. That is, the bush shaft 120 transmits winding force to the webbing on the retractor shaft 102.

The stay shaft 160 is of H shaped cross section and is inserted onto the projector 126, in which an inner extension 160a includes a hole to permit the projector 126 to be fittedly passed therethrough, one portion of which is inserted into the second boss 142 of the holder 140 and the other portion of which is inserted into a boss 173 formed at the center of a cover 170 as illustrated in detail below. At the same time, the end of the projector 126 is seated on a groove 172 of the cover 170. The stay shaft 160 also comprises a hooking groove 164 formed on the outer surface thereof to allow the inner end of the second coil spring 150 to be retained therein.

Therefore, the clutch apparatus 110 is assembled so that the holder 140 enables the first and second coil springs 130 and 150 in the receptacles 140a and 140b, respectively, with the inner and outer ends of the coil springs 140a and 140b being respectively hooked in the hooking grooves 148 and 146 of the receptacles 140a and 140b, the hooking groove 124 of the bush shaft 120 and the hooking groove 164 of the stay shaft 160.

Advantageously, the clutch apparatus 110 furthermore comprises a lever apparatus 180 to interrupt the operation thereof. The lever apparatus 180 comprises a lever 184 pivotable about a pin 186 fitted into a hole 182 and a solenoid 190 to operate it. The lever apparatus 180 is positioned directly below the lower portion of the holder 140, so that the lever 184 is engaged at the front end with the ratchet portion 148 formed on the outer circumference of the receptacle 140a upon its assembly. The lever 184 includes a key groove 183 formed at the other portion. The solenoid 190 includes a plunger 194, a return spring 196 inserted into the plunger 194 retained in the center portion of the return spring 196 upon its assembly and a projecting end 192 of the plunger 194 inserted into the key groove 183. The solenoid 190 is electrically connected to an electrical control unit (ECU) 206 constituted as a main control unit of an automobile to be under its operating control. The ECU 206 is subject to receive a signal from a limit switch 204 for detecting the insertion of a buckle. For example, the limit switch 204 at one end is connected to a battery 208 and at the other side to the ECU 206 to operate when a tongue 202 coupled to a web 106 is inserted into the buckle, so that the ECU 206 detects the webbing. Then, the lever apparatus 180 and the clutch apparatus 110 cooperate with each other as described in detail below.

On the other hand, the clutch apparatus 110 is mounted in a cover 170 and properly positioned with a base 112. The base 112 is fixed on one side surface of a retractor and includes a hole 114 formed at the center to seat the disk 129 of the bush shaft 120 coupled with a retractor shaft 104, in which the shoulder 120a is hung on the half portion of the base thickness in the hole 114, so that the first coil spring 130 does not contact with the base 112. Therefore, the friction of the first coil spring 130 against the base 112 is minimized.

Additionally, the base 112 includes a fixing portion 116 to enable the one end of the lever pin 186 to be rotated, a positioning portion 119 formed below the fixing portion 116 to position the solenoid 190 and a hook portion 118 formed around the circumference to be coupled with the cover 170 upon assembly.

The cover 170 includes a boss 173 projected from the inner surface thereof to be coupled with the stay shaft 160 and the bush shaft 120, in which the stay shaft 160 is inserted onto the boss 173 and the projector 126 of the bush shaft 120 is inserted into a groove 172 formed at the center of the boss 173. A first retainer 174 is formed at the lower portion of the cover 170 to enable the other end of the lever pin 186 to be rotated and receive the lever apparatus 180. A second retainer 176 is formed directly below the first retainer 174 to position the solenoid 190 therein. A coupling portion 178 is provided around the circumference to be coupled with the hook portion 118.

Figure 5:
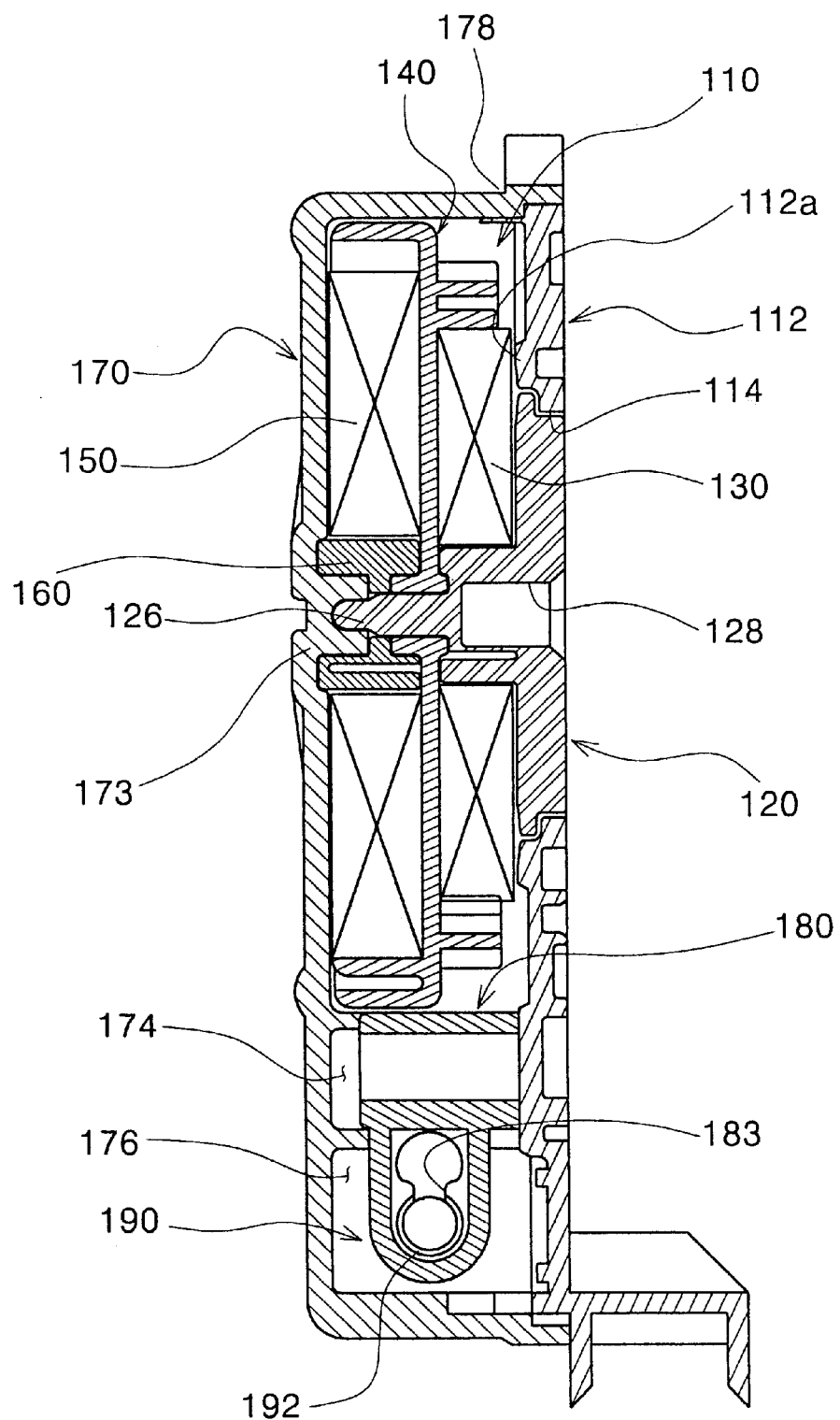
FIG. 5 is a cross sectional view of the assembled state of the tension reducer according to the invention.
Figure 6:
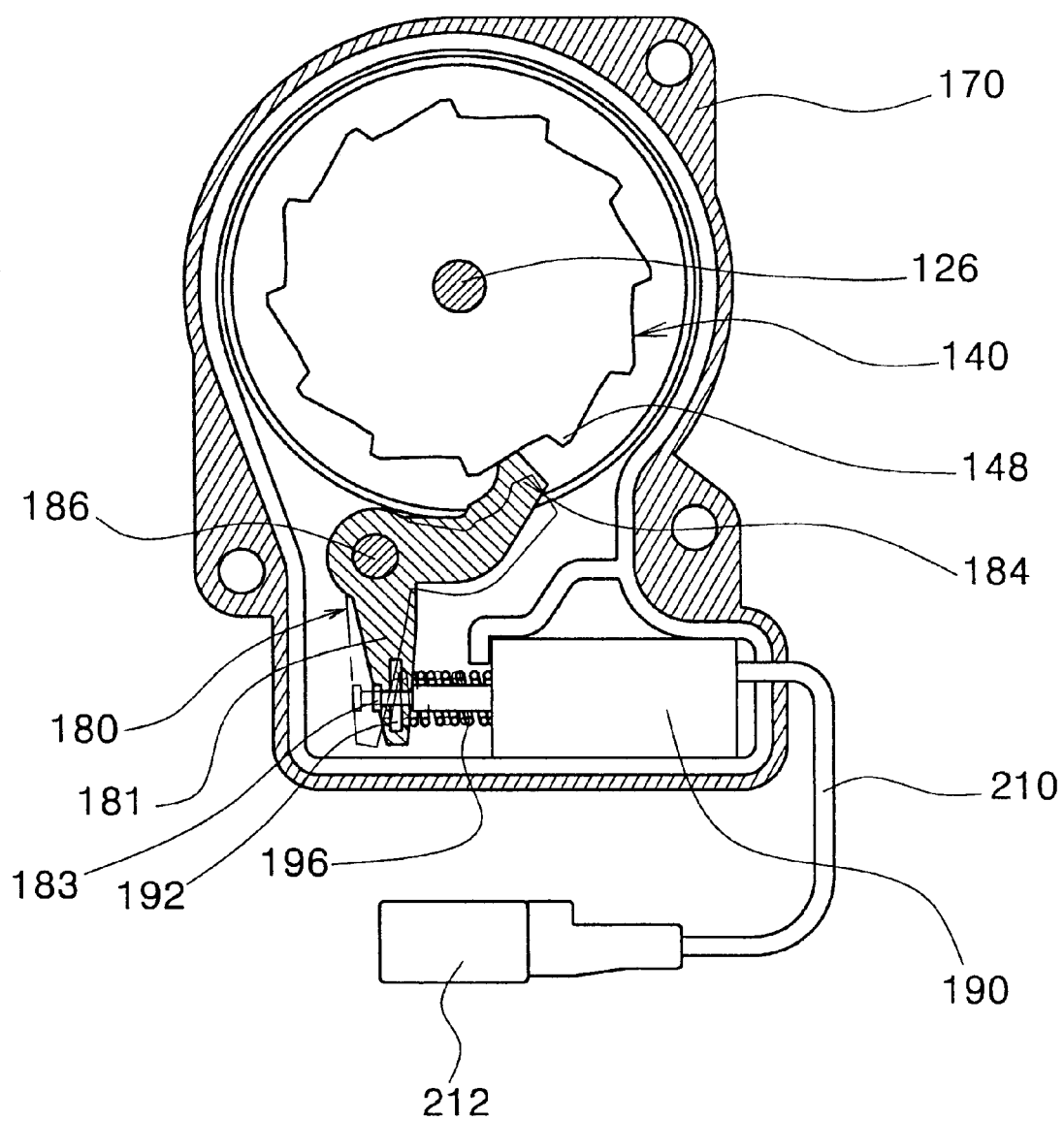
FIG. 6 is a side view of the assembled state of the tension reducer according to the invention.

The tension reducer is mounted on the retractor after being assembled as shown in FIGS. 5 and 6. That is to say, as the clutch apparatus 110 is mounted in the cover 170 with the first and second coil springs 130 and 150 being retained in the holder 140, the stay shaft 160 is mounted onto the boss 173 and the projector 126 of the disk 129 is rotatably positioned in the groove 172 of the boss 173. The lever apparatus 180 and the solenoid 190 are properly installed in the first and second retainers 174 and 176, respectively, as described above. Then, the base 112 and the cover 170 are coupled with each other through their hook portion 118 and 178. At that time, the lever pin 186 is rotatably fixed at one end on the fixing portion 116 and at the other end on the fixing portion of the first retainer 174, and the solenoid 190 is placed in the positioning portion 119. Thus, the front end of the lever 184 is engaged with the ratchet portion 148, if necessary. The key groove 183 is coupled with the projecting end 192 elastically supported by the return spring 196. Of course, the solenoid 190 is connected to a plug 212 by an electrical wire 210.

The tension reducer operates as follows:

First, a passenger pulls out the webbing 106 after sitting on a seat. At that time, the webbing 106 is unwound from the winding shaft 102. As the winding shaft 102 is rotated to release the webbing 106, the bush shaft 120 is rotated to wind the first coil spring 130 around its circular boss 122. When the first coil spring 130 is completely wound on the circular boss 122, the clutch apparatus 110 is rotated. The rotation forces the second coil spring 150 to be wound in order to impart the winding force to the winding shaft 102.

Next, the passenger inserts the tongue 202 into the buckle with the webbing 106 being drawn out and loosen. At that time, the limit switch 204 is operated to make an electrical signal sent to the ECU 206. The ECU 206 supplies the power source from the battery 208 to the solenoid 190 based on the signal. The solenoid 190 pulls the plunger 194 against the elastic force of the spring 196 and pivots the lever apparatus 180 rightward as shown by a solid line in FIG. 6. The pivoting of the lever apparatus 180 causes the front end of the lever 184 to hook onto the ratchet portion 148 and prevents the rotation of the clutch apparatus 110. Therefore, as the winding operation of the winding shaft 102 is stopped, the first coil spring 130 connected to the retractor shaft 102 acts to loosen the webbing and reduces the tightness thereof against the breast of the passenger. At that time, the spool 102 is rotated in a reverse direction of arrow P shown in FIG. 2.

Thereafter, when the tongue 202 is removed from the buckle, the ECU 206 cuts off the power of the battery 208 to the solenoid 190. The plunger 194 is projected by the return spring 194 and moved leftward to force the lever 184 to be rotated as shown by a dotted line. At that time, the state of coupling the lever front end with the ratchet portion 148 is released, and the winding shaft 102 is rotatably subjected to winding of the webbing 106.

Herein, it is noted that even though the webbing is being wound or unwound, the clutch apparatus operates with the holder and the first and second coil springs, simultaneously. Therefore, the holder does not cause an imbalanced operation of the clutch apparatus due to the eccentricity of two coil springs.

As described above, the invention realizes a clutch apparatus comprising only one unit of a holder, first and second coil springs, a bush shaft and a stay shaft, in which the holder includes first and second hooking grooves formed to retain their outer ends therein, respectively, and the outer ends of the coil springs are both fixed to the stay shaft and the bush shaft.

Also, the configuration of the bush shaft is supposed to minimize the friction against a base. The circular boss of the holder facilitates the assembly of the bush and stay shafts with the holder. Even after the clutch apparatus is assembled, the circular boss enables the holder to be smoothly rotated. The invention has an advantage in that the eccentric rotation of the holder doesn't occur due to the axial length of the circular boss formed in the second coil spring receptacle being longer than that of the circular boss formed in the first coil spring receptacle.

What is claimed is:

1. A tension reducer for relieving the drawing force of a retractor for an automobile safety belt comprising:

a clutch including a pair of coil spring receptacles for respectively containing first and second coil springs operatively connected for enabling the elastic forces of said first and second coil springs to be changed directly into a rotation force when pulling out or retracting a webbing;

a lever for stopping the rotation of the clutch when the webbing is not drawn out further;

a cover for enabling the clutch to be rotatably mounted therein and the lever to be properly positioned therein; and, a base for enabling the clutch and the lever to be fixed therein with the cover;

wherein the clutch comprises a holder including said two coil spring receptacles respectively formed on both sides of a middle wall, said first and second coil springs mounted in the receptacles, respectively, in which first and second hooking grooves each is formed in inner surfaces of the first and second receptacles to retain outer ends of the first and second coil springs, a bush shaft including a hooking groove formed on an outer surface thereof to allow the other end of the second coil spring to be retained therein, and a stay shaft including a hooking groove formed on an outer surface thereof to allow the other end of the first coil spring to be retained therein;

wherein the bush shaft comprises a circular disk including a shoulder on one side surface inserted into a hole of the base and a projector on the other side surface rotatably supported in a groove of a boss formed on the inner surface of the cover.

2. The tension reducer as claimed in claim 1, wherein:

the bush shaft is formed as an independent unit separated from a webbing plate of a retractor, wherein the circular disk is partly seated in the hole of the base with the shoulder being formed in a step form.

3. A tension reducer for relieving the drawing force of a retractor for an automobile safety seat belt comprising:

a clutch including a pair of coil spring receptacles for respectively containing first and second coil springs operatively connected for enabling the elastic forces of said first and second coil springs to be changed directly into a rotation force when pulling out or retracting a webbing;

a lever for stopping the rotation of the clutch when the webbing is not drawn out further;

a cover for enabling the clutch to be rotatable mounted therein and the lever to be properly positioned therein; and, a base for enabling the clutch and the lever to be fixed therein with the cover;

wherein the clutch comprises a holder including said two coil spring receptacles respectively formed on both sides of a middle wall, said first and second coil springs mounted in the receptacles, respectively, in which first and second hooking grooves each is formed in inner surfaces of the first and second receptacles to retain outer ends of the first and second coil springs, a bush shaft including a hooking groove formed on an outer surface thereof to allow the other end of the second coil spring to be retained therein, and a stay shaft including a hooking groove formed on an outer surface thereof to allow the other end of the first coil spring to be retained therein;

wherein the holder comprises first and second bosses coupled with the bush shaft and the stay shaft, respectively, each boss respectively extending a distance l1 and l2 in an axial direction into the first and second coil spring receptacles, the distance l2 being longer than distance l1 in order to induce the rotation of the holder.

4. A tension reducer for relieving the drawing force of a retractor for an automobile safety seat belt comprising:

a clutch including a holder in the form of a unit; and first and second springs received in the unit for enabling the elastic forces of said first and second springs generated by a seat belt webbing to be changed directly into a rotation of the holder when pulling out and retracting the webbing;

a lever cooperating with the holder to stop the rotation of the clutch when the webbing is not drawn out further;

a cover including a boss projecting from an inner surface thereof to be coupled with a stay shaft and a projector of a bush shaft for enabling the clutch to be rotatably mounted therein and the lever to be properly positioned therein with a base; and, the base including a fixing portion to enable one end of a lever pin of the lever to be rotated, a positioning portion formed below the fixing portion to position a solenoid and a hook portion formed around the circumference to be coupled with the cover upon assembly for enabling the clutch and the lever to be fixed therein with the cover.

5. The tension reducer as claimed in claim 4, wherein:

the holder including said two coil spring receptacles formed on both of its sides by the reference of a middle wall, the first and second coil springs mounted in the receptacles, respectively, in which first and second hooking grooves each is formed in the inner surfaces of the first and second receptacles to retain the outer ends of the first and second coil springs, the bush shaft including a hooking groove formed on a predetermined position of its outer circumference surface to allow the other end of the second coil spring to be retained therein, and the stay shaft including hooking grooves formed on the predetermined outer surface to allow the other end of the first coil spring to be retained therein.

6. The tension reducer as claimed in claim 5, in which:

the bush shaft comprises a circular disk including a shoulder on one side surface inserted into a hole of the base and a projector on the other side surface rotatably supported in a groove of a boss formed on the inner surface of the cover.

7. The tension reducer as claimed in claim 6, in which:

the bush shaft is formed as an independent unit separated from a webbing plate of a retractor, in which the circular disk is partly seated in the hole of the base with the shoulder being formed in a step form.

8. The tension reducer as claimed in claim 5, in which;

the holder comprises further first and second bosses coupled with the bush shaft and the stay shaft, respectively, each of which is extended a distance l1 and l2 in an axial direction into the first and second coil spring receptacles, the distance l2 being set to be longer than one l1 in order to induce the balancing rotation of the holder.

\* \* \* \* \*